No. 738,182. PATENTED SEPT. 8, 1903.
O. A. GOOCH.
LATHE ATTACHMENT.
APPLICATION FILED APR. 2, 1903.
NO MODEL.
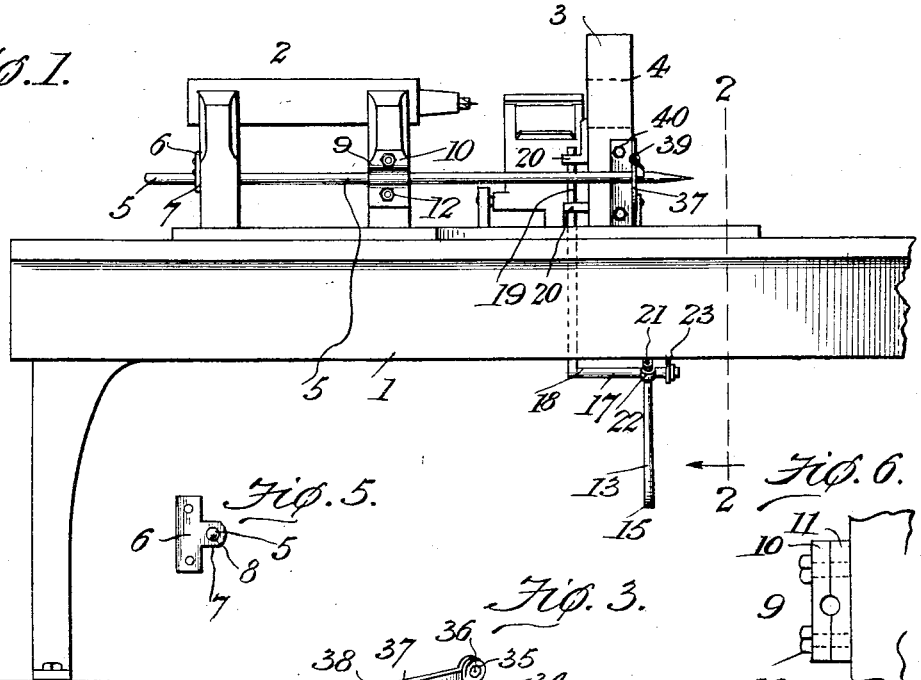
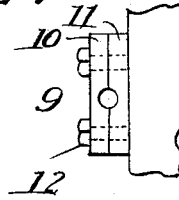
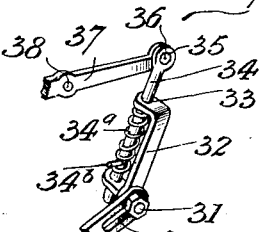
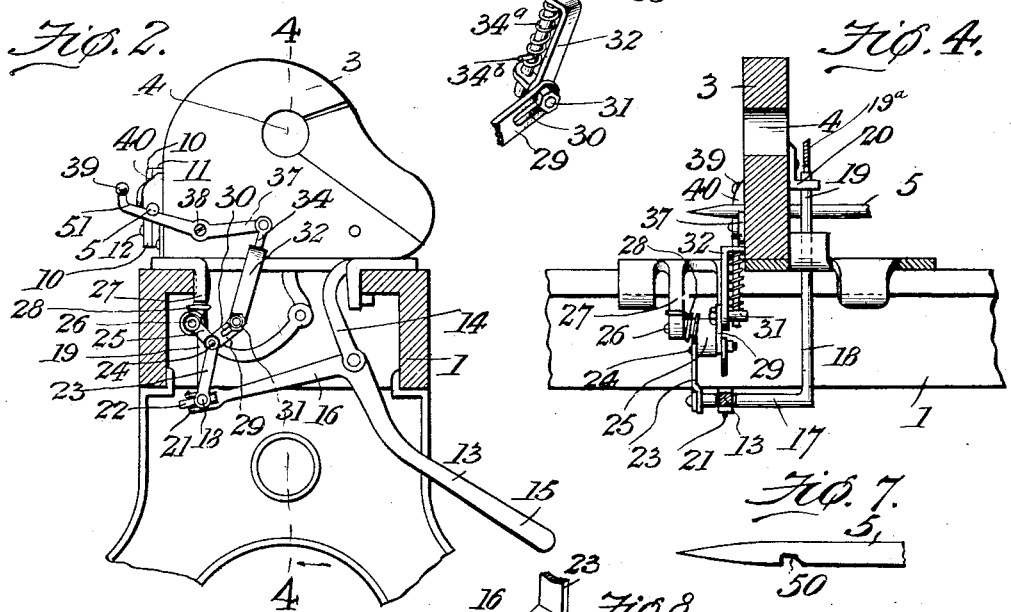
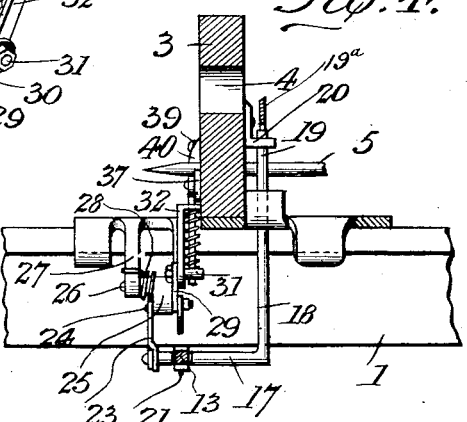
Witnesses
E. F. Stewart
Baxter Morton
Orrel A. Gooch Inventor
by C. A. Snow & Co.
Attorneys No. 738,182. Patented September 8, 1903.

UNITED STATES PATENT OFFICE.

ORREL AUGUSTUS GOOCH, OF EAST MACHIAS, MAINE.

LATHE ATTACHMENT.

SPECIFICATION forming part of Letters Patent No. 738,182, dated September 8, 1903.

Application filed April 2, 1903. Serial No. 150,808. (No model.)

*To all whom it may concern:*

Be it known that I, ORREL AUGUSTUS GOOCH, a citizen of the United States, residing at East Machias, in the county of Washington and State of Maine, have invented a new and useful Lathe Attachment, of which the following is a specification.

This invention relates to attachments for wood-turning lathes, and more especially to lathes for turning and cutting off successively a plurality of articles from the same stick of wood.

The object of the invention is to provide a connection between the tool-carriage and tail-stock of lathes of the type specified by means of which the tool-carriage and tail-stock may be kept at exactly the same distance apart during the turning operation, thereby preventing the shifting of the tool-carriage before the article is cut off from the stick of material, which frequently occurs when no such connection is provided between the tool-carriage and tail-stock.

In lathes of the character specified the tool-carriage is freely movable along the lathe-bed. If no connection between the tool-carriage and tail-stock is provided, it is necessary for the operator to use his left hand in keeping the tool-carriage in proper relation to the tail-stock in order to insure the cutting off of each turned article at such point that the articles produced will be of exactly the same length. Even with careful operators the tool-carriage frequently slips slightly and the cut-off does not always occur at the same point, thereby causing a considerable waste of material and loss of a number of turned articles because they are not of the proper length.

To obviate the defect above stated and to relieve the operator of the necessity of using one hand to hold the tool-carriage in proper position at the time of cut off, so insuring perfectly uniform lengths in the articles turned, I provide the latch mechanism hereinafter fully described, and shown in the accompanying drawings, forming a part of this specification, and having the novel features thereof specifically pointed out in the appended claims.

In the drawings, Figure 1 is a rear elevation of a lathe with my invention applied thereto. Fig. 2 is a transverse vertical section through the lathe on the line 2 2 in Fig. 1, showing the mechanism for releasing the latch. Fig. 3 is a detail view of a portion of the latch-releasing mechanism. Fig. 4 is a longitudinal section on line 4 4 of Fig. 2 looking in the direction indicated by the arrow. Fig. 5 is a view in elevation of the guide 6. Fig. 6 is a detail view from the side of clamp 9. Fig. 7 is a detail view from the side of the rod 5. Fig. 8 is a detail view in perspective, showing the antifriction connection between the operating-lever and the rod carrying the cut-off knife.

In the several figures of the drawings corresponding parts are indicated by the same characters of reference throughout.

Referring to the drawings by reference characters, 1 designates the supporting frame and bed of a wood-turning lathe of the type to which my attachment is to be applied.

2 designates the tail-stock, slidably mounted upon the bed of the lathe, and 3 designates the tool-carriage, having an opening 4 for the passage of the stick of wood from which the articles are turned in the lathe.

At the rear side of the tail-stock I provide a latch-bar 5, adjustably mounted by means of a guide-plate 6, having a lug 7, provided with an opening 8, for the passage of the bar 5, and a clamp 9, comprising the plates 10 and 11, which are secured together by means of screws 12. Each of the plates 10 and 11 has a semicircular groove provided on one face thereof to form a seat for the latch-bar 5, which is securely held by the clamp when the screws 12 are in position.

13 designates a bell-crank lever supported in a pendent bracket 14, carried by the tool-carriage, as shown. The longer arm 15 of the bell-crank lever forms a handle by means of which the lever is operated, and the shorter arm 16 is bifurcated at its end for the passage of the horizontal portion 17 of the bent rod 18, the vertical part 19 of which is slidably mounted in guides 20, provided on the tool-carriage. At the upper end of the vertical portion 19 is mounted a cut-off knife $19^a$, which serves to sever the finished articles from the stick of material from which they are turned. To prevent disengagement of horizontal section 17 of the bent rod 18 from the bifurcated end of the bell-crank lever 13, I provide the pin 21, extending through the prongs of the bifurcated portion of lever 13, and an antifriction-roll 22, mounted on said pin to prevent frictional engagement of the section 17 and pin 21.

The free end of section 17 of the rod 18 is connected, by means of a link 23, with a pin 24, rotatably mounted in an opening provided in one end of a link 25, the other end of which is rotatably mounted on a pin 26, carried by two depending lugs 27 upon the tool-carriage.

In order to hold the bent rod 18 upon which the cut-off knife is mounted in inoperative position, I provide the spring 28, which has one end in engagement with the link 25 and the other end pressing against one of the lugs 27, thus keeping the free end of link 25 normally depressed, as shown in full lines in Fig. 2. Pivotally mounted on one end of pin 24 is a link 29, provided with a slot 30 for the passage of a clamping-bolt 31. Held in rigid engagement with the link 29 by means of the clamping-bolt 31 is an arm 32, whose upper end is bent, as shown, and provided with an opening 33 for the passage of a rod 34, which also passes through an opening formed in the head of clamping-bolt 31. Between the two guide-openings through which rod 34 passes I provide a spiral spring 34$^a$, which encircles rod 34 and has the upper end thereof in contact with the bent portion or member 32 and the lower portion engaging a pin 34$^b$, which extends through rod 34. At its upper end rod 34 is bent to form an eye 35, with which is pivotally connected, by means of a screw 36, the pivoted latch 37, which is mounted upon pivot 38, as shown. At its free end the latch 37 has a knob 39 to form convenient means for releasing the latch by hand.

The latch 37 is so mounted upon the tool-carriage that it is normally held in engagement with a notch formed on the latch-bar 5, near one end thereof, and immediately above the latch-bar there is provided on the tool-carriage a combined guide and abutment 40, the under surface of which is recessed for the passage of the latch-bar 5 and which is so placed that the engagement of latch 37 with the bar holds the bar firmly in contact with the member 40, thus relieving the latch-bar of any strain imposed thereon by the latch and preventing bending of the latch-bar under the pressure of the latch.

In use the latch-bar is adjusted in position in the clamp of the tail-stock of the lathe, so that when the latch of the tool-carriage engages a notch 5$^a$ on the latch-bar the tail-stock and tool-carriage will be at exactly the right distance apart. The adjustment having been made, the material to be turned is put in position in the lathe in the usual manner, one end being firmly gripped by the head-stock (not shown) and the other resting against the center provided on the tail-stock. The material extends through the opening in the tool-carriage, as already explained, and the tool-carriage will be held in the desired position by means of the engagement of latch 37 with the notch 5$^a$, provided for it on the latch-bar 5. When the turning is complete, the arm 15 of bell-crank lever 13 will be depressed, thereby raising the cut-off knife, (not shown,) which will be mounted on the upper end of the vertical portion 19 of the rod 18, to be brought into contact with the stick of material to sever the turned article therefrom. The rise of the cut-off knife will be brought about by the upward movement of bent rod 18, which will cause simultaneous upward movement of the free end of link 25 and the pin 24, mounted therein. The pin 24 will also force upward the link 29, member 32, and rod 34, as the end of bolt 31 will come in contact with pin 34$^b$ and so force the rod 34 upward with it. Movement upward of the rod 34 will of course elevate the inoperative end of the latch 37, depressing the operative end and disengaging the latch and latch-bar. This disengagement will now do no harm, however, for before the latch is thrown out of engagement with the latch-bar the cut-off knife will have begun the operation of severing the turned article from the stick of material, and it will be impossible for the tool-carriage to shift until the turned article is completely severed from the stick. If it is at any time desired to separate the tail-stock and tool-carriage before the article is completely turned and without bringing the cut-off knife into play, latch 37 may be thrown into inoperative position by downward pressure upon the knob 39, permitting the shifting of the tool-carriage at will.

It will be observed that the mechanism described permits no relative movement of the tool-carriage and tail-stock of the lathe during the turning operation, but permits the separation of the tail-stock and tool-carriage as soon as the cut off of the turned article has begun. It will further be noticed that the release of the tool-carriage from the tail-stock is brought about by the same mechanism which brings the cut-off knife into play upon the stick of material in the lathe to sever therefrom the turned article, thus adding no additional effort to that required in cutting off the turned article.

It will further be noted that the provision of spring 34$^a$ makes it possible to release the latch by pressure upon the knob 39 without actuating the cutting-off knife, as the spring 34$^a$ has much lighter tension than spring 28, which acts upon the link 25 to keep it normally depressed, thus keeping the cut-off knife in inoperative position.

It is to be understood that I do not wish to be limited to the exact form, proportions, or mode of assemblage of the elements hereinbefore described, and illustrated in the accompanying drawings, but reserve the right to make such changes therein as do not depart from the spirit of the invention.

Having thus described the construction and operation of my invention, what I claim as new, and desire to secure by Letters Patent, is—

1. The combination in a wood-turning lathe of a supporting-bed, a tail-stock movable on said bed, a latch-bar carried by said tail-stock, a tool-carriage movable on the bed, and a latch mounted on said tool-carriage and adapted to engage said latch-bar.

2. The combination in a wood-turning lathe of a bed, a tail-stock slidably mounted on the bed, a latch-bar adjustably mounted on said tail-stock, a tool-carriage movable on said bed, and a latch mounted on said tool-carriage and adapted to engage said latch-bar.

3. The combination in a wood-turning lathe of a bed, a tail-stock slidable on said bed, a guide provided at one end of said tail-stock, a clamp provided at the other end of said tail-stock, a latch-bar passing through said guide and adjustably held in position by said clamp, a tool-carriage slidable on said bed, and a latch mounted on said tool-carriage and adapted to engage said latch-bar.

4. The combination in a wood-turning lathe of a tail-stock, a latch-bar mounted thereon, a tool-carriage, and an automatic latch adapted to engage said latch-bar.

5. The combination in a wood-turning lathe of a bed, a tail-stock slidable on said bed, a latch-bar mounted on said tail-stock, a tool-carriage slidable on said bed, and an automatic pivoted latch carried by said carriage and adapted to engage said latch-bar.

6. The combination in a wood-turning lathe of a bed, a tail-stock mounted on said bed, a latch-bar mounted on said tail-stock, a tool-carriage slidable on said bed, and a spring-pressed pivoted latch adapted to engage said latch-bar.

7. The combination in a wood-turning lathe of a bed, a tail-stock slidable on said bed, a latch-bar carried by said tail-stock, a tool-carriage, a cut-off knife mounted on said tool-carriage, a spring-pressed latch also mounted on said tool-carriage and adapted to engage said latch-bar, an operating-lever, connections between said lever and said cut-off knife and between said lever and said latch whereby when said lever is depressed said cut-off knife will be brought into operation and said latch will be thrown out of engagement with said latch-bar.

In testimony that I claim the foregoing as my own I have hereto affixed my signature in the presence of two witnesses.

ORREL AUGUSTUS GOOCH.

Witnesses:
 HENRY LORING GOOCH,
 JAMES ANSON PALMER.